Oct. 11, 1927.
A. T. POTTER
1,644,689
WINDSHIELD PIVOT
Filed Sept. 24, 1923
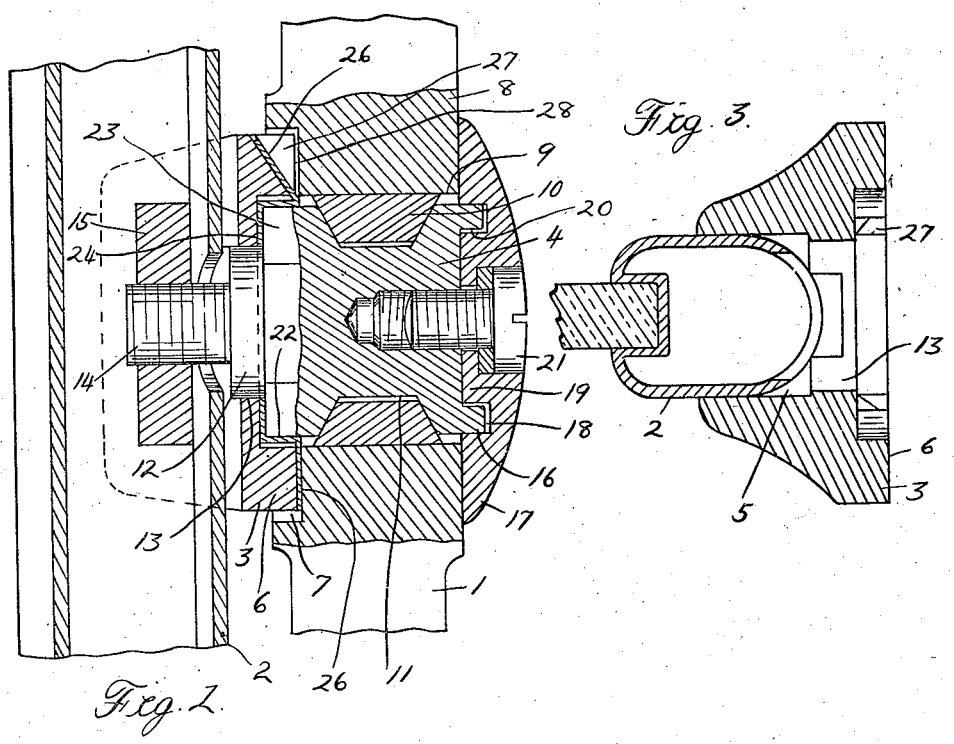
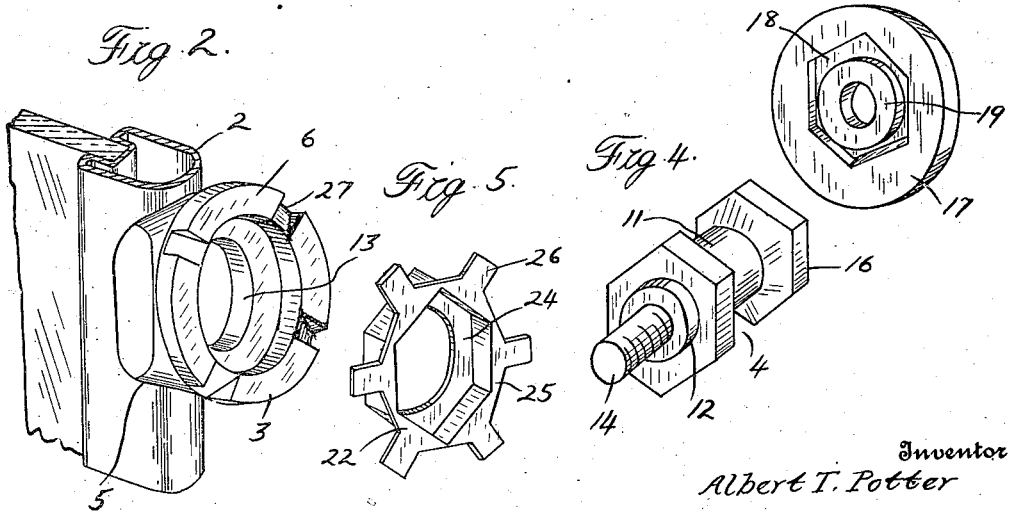
Inventor
Albert T. Potter
By Whittemore Hulbert Whittemore
 +Belknap   Attorneys Patented Oct. 11, 1927.

1,644,689

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD PIVOT.

Application filed September 24, 1923. Serial No. 664,544.

This invention relates to pivot constructions and refers more particularly to windshield pivot constructions.

An object of the invention is to provide a strong and durable pivot construction in which the pivot head is preferably formed separately from the pivot stud and is secured to the pivotal member by the pivot stud.

Another object is to provide simple and effective means for non-rotatively securing the pivot stud to the head in various positions of rotative adjustment.

With the above and other objects in view, the invention consists of certain novel features of construction as will be more fully described and particularly pointed out in the appended claims.

In the accompanying drawing:—

Figure 1 is a vertical sectional view of the pivot construction and showing portions of the standard in elevation;

Figure 2 is a detail perspective view of the pivot head mounted upon the frame of a windshield section;

Figure 3 is a cross section taken on line 2—2 of Figure 1;

Figure 4 is a detail perspective view of the pivot stud;

Figure 5 is a detail perspective view of the locking sleeve;

Figure 6 is a detail perspective view of the cap.

In these views, the numeral 1 designates a supporting standard for a tubular sheet metal frame 2 of a pivotal windshield section. The pivot for the windshield section is preferably formed of two parts and comprises a head 3 and an annularly grooved stud 4. The head 3 is preferably provided with a vertically slotted portion 5 that embraces the frame 2 and an annular portion 6 that fits within an annular recess 7 in one side of an enlargement 8 of the standard. This enlargement is also preferably provided with an opening 9 that is preferably concentric with the recess 7 and that receives a sectional bearing 10 for the annularly grooved portion 11 of the stud. Any suitable means (not shown) may be employed for clamping the sections of the pivot bearing 10 upon the stud to retain the shield in any desired position of rotative adjustment.

The stud 4 is preferably provided with a reduced annular portion 12 fitting within an annular opening 13 in the head and has a reduced threaded portion 14 extending into the tubular frame 2 of the windshield and engaging a suitable filler 15. The stud 4 is preferably provided at its outer end with a hexagonal head 16 that may be readily engaged by a suitable tool (not shown) for adjusting the threaded portion 14 in the windshield frame and that is preferably concealed when adjusted by a cap member 17. This cap has a hexagonal recess 18 that receives the hexagonal head of the stud and is also provided within the hexagonal recess with an annular projection 19 that engages an annular recess 20 in the head of the stud. The cap conceals the joint between the stud and the enlargement 8 of the standard and is secured to the stud preferably by means of a screw 21 having its head counter-sunk centrally in the cap and having its shank axially threaded into the stud head.

For non-rotatively securing the stud 4 to the head 3 in various positions of rotative adjustment, I preferably provide a sheet metal sleeve 22 which is preferably hexagonal in shape for fitting a hexagonal portion 23 of the stud within the annular portion 6 of the head. This sleeve is preferably provided at one end with an inwardly extending flange 24 surrounding the annular portion 12 of the stud between the hexagonal portion 23 and the head 3 and is provided at its other end with an outwardly extending flange 25 having a series of radially extending projections 26 that are adapted to be bent into engagement with a plurality of rearwardly inclined recesses 27 in the annular portion 6 of the head. The recesses 27 are preferably spaced apart in such a manner that only two diametrically arranged projections 26 may be bent into engagement therewith at one time. Thus, the other projections will engage the outer face of the annular portion 6 between the recesses 27 and will separate the said annular portion from the base 28 of the recess 7 in the standard.

From the foregoing it will be readily apparent that in assembling the described construction the threaded portion 14 of the stud may be screwed into the filler member 15 until said stud seats firmly upon the head 3. The stud may be so seated as to register two of the tongues 26 with two opposite notches 27 of the head, and by bending said tongues into the registered notches, the stud may be positively and securely locked against rotation with respect to the head. A sufficient number of the tongues 26 and notches 27 are provided to insure that the stud may be screwed firmly to its seat upon the head and yet establish a registration between certain of the tongues and certain of the notches.

While it is believed that from the foregoing description, the nature and advantages of the invention will be readily apparent, I desire to have it understood that I do not limit myself to what is herein shown and described and that such changes may be resorted to when desired, as fall within the scope of what is claimed.

What I claim as my invention is:—

1. In a pivot construction, the combination with a pivotal member and a support therefor, of a pivot for said pivotal member including a head engaging the pivotal member, a stud rotatably mounted in said support and securing said head to said pivotal member, and a member non-rotatively sleeved upon said stud and having a projection engaging said head for non-rotatively locking said stud to said head in selective positions of rotative adjustment.

2. The combination with a pivotal member and a support therefor, of a pivot for said member including a head having a portion embracing said member and having an annular portion provided with spaced recesses, a stud securing said head to said member and having a portion rotatably mounted in said support, said stud having a polygonal portion within the annular portion of said head, and a member having a polygonal portion sleeved upon the polygonal portion of said stud and having means engageable with the recesses in the annular portion of said head for locking said stud to said head in selective positions of rotative adjustment.

3. The combination with a pivotal member and a support therefor, of a pivot for said member including a head having a portion embracing said member and having an annular portion provided with spaced recesses, a stud securing said head to said member and having a portion rotatably mounted in said support, said stud having a polygonal portion within the annular portion of said head, and a member having a polygonal portion sleeved upon the polygonal portion of said stud, and having diametrically arranged projections engageable with the recesses in the annular portion of said head for locking said stud to said head in selective positions of rotative adjustment.

4. The combination with a pivotal member and a support therefor, of a pivot for said member including a head, a stud securing said head to said member and having a portion rotatably mounted in said support, said stud having a polygonal end portion, a cap having a polygonal opening snugly receiving said end portion of said stud and concealing the joint between said stud and support, said stud having a polygonal portion intermediate the ends thereof, and a member sleeved upon the intermediate polygonal portion of said head and having means engageable with said head for locking said stud to said head in selective positions of rotative adjustment.

5. The combination with a pivotal member and a support therefor, having an apertured bearing, of a stud attached to said pivotal member mounted in the aperture of said bearing, and having a peripheral journal face engaging said bearing, a member engaging said pivotal member having a recess receiving one end of the stud, and being formed with a plurality of notches radially extending from said recess, and a member clamped between the stud and its seat within the recess having a radial projection engaging in one of said notches and interlocking the stud and seating member against relative rotation.

6. The combination with a pivotal member and a support therefor having an apertured bearing, of a pivot for said member including a head having a portion embracing said member and having an annular opening therein, a stud formed separately from said head mounted in the aperture of said bearing and having a peripheral journal face engaging with said bearing, said stud having a portion adapted to seat within the annular portion of said head, means carried by the stud rotatively engageable with the pivotal member to attach the stud to said member, and means for positively and non-rotatively locking the stud to said head in selective positions of rotation with respect to said head.

7. The combination with a pivotal member and a support therefor having an apertured bearing, of a stud attached to said pivotal member mounted in the aperture of said bearing and having a peripheral journal face engageable with said bearing, and a member non-rotatively sleeved upon said stud and having a projection engaging said pivotal member for non-rotatively locking the stud to said pivotal member in selective positions of rotative adjustment.

8. In a pivot construction, the combination with a pivotal member and a support therefor, of a pivot for said pivotal member including a head engaging the pivotal member, a stud rotatably mounted in said support and securing said head to said pivotal member, a member non-rotatably sleeved upon said stud for non-rotatively locking said stud to said head, and a cap member having a portion receiving a portion of the stud and concealing the joint between the stud and the support.

9. The combination with a pivotal member and a support therefor, of a pivot for said member including a head having a portion embracing said member and having an annular opening therein, a stud securing said head to said member and having a portion rotatably mounted in said support, and means for non-rotatively securing the stud to said head in various positions of rotative adjustment including a member sleeved upon the stud within the annular portion of said head.

10. The combination with a pivotal member and a support therefor having an apertured bearing, of a stud attached to said pivotal member having a peripheral journal face engaging said bearing within the aperture of said bearing, and having a polygonal portion between said support and the pivotal member, a member engaging said pivotal member having a portion embracing said stud and having another portion formed with a notch, and means for locking said stud against rotation comprising a member having a polygonal portion engaging the polygonal portion of said stud and having a radial projection engaging said notch.

In testimony whereof I affix my signature.

ALBERT T. POTTER.